(12) United States Patent
Xie et al.

(10) Patent No.: US 10,534,493 B2
(45) Date of Patent: Jan. 14, 2020

(54) MUTUAL CAPACITIVE TOUCH SUBSTRATE, MUTUAL CAPACITIVE TOUCH PANEL, AND MUTUAL CAPACITIVE TOUCH APPARATUS

(71) Applicants: HEFEI XINSHENG OPTOELECTRONICS TECHNOLOGY CO., LTD., Hefei, Anhui (CN); BOE TECHNOLOGY GROUP CO., LTD., Beijing (CN)

(72) Inventors: Xiaodong Xie, Beijing (CN); Zouming Xu, Beijing (CN); Ming Hu, Beijing (CN); Ming Zhang, Beijing (CN); Min He, Beijing (CN); Jian Tian, Beijing (CN); Jing Wang, Beijing (CN)

(73) Assignees: HEFEI XINSHENG OPTOELECTRONICS TECHNOLOGY CO., LTD., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/356,418

(22) Filed: Mar. 18, 2019

(65) Prior Publication Data

US 2019/0310727 A1  Oct. 10, 2019

Related U.S. Application Data

(63) Continuation of application No. 15/501,852, filed as application No. PCT/CN2016/082862 on May 20, 2016, now Pat. No. 10,310,688.

(30) Foreign Application Priority Data

Aug. 24, 2015 (CN) .......................... 2015 1 0524282

(51) Int. Cl.
*G06F 3/044* (2006.01)

(52) U.S. Cl.
CPC .... *G06F 3/044* (2013.01); *G06F 2203/04111* (2013.01); *G06F 2203/04112* (2013.01)

(58) Field of Classification Search
CPC combination set(s) only.
See application file for complete search history.

(56) References Cited

U.S. PATENT DOCUMENTS

| 2011/0025639 A1* | 2/2011 | Trend ..................... G06F 3/044 345/174 |
| 2014/0078106 A1 | 3/2014 | Yao et al. |

(Continued)

FOREIGN PATENT DOCUMENTS

| CN | 101833404 A | 9/2010 |
| CN | 203588242 U | 5/2014 |

OTHER PUBLICATIONS

International Search Report & Written Opinion dated Aug. 24. 2016 regarding PCT/CN2016/082862.

(Continued)

*Primary Examiner* — Jennifer Mehmood
*Assistant Examiner* — Deeprose Subedi
(74) *Attorney, Agent, or Firm* — Intellectual Valley Law, P.C.

(57) ABSTRACT

The present application discloses a mutual capacitive touch substrate comprising a matrix of a plurality of electrode units, adjacent electrode units complementarily matching each other. Each electrode unit comprises a first electrode having a first undulating boundary; a second electrode having a second undulating boundary; and a fill pattern between the first electrode and the second electrode, having an undulating boundary substantially complementary to corresponding portions of the first undulating boundary and (Continued)

the second undulating boundary. The first electrode, the second electrode, and the fill pattern in a same electrode unit are electrically isolated from each other.

20 Claims, 4 Drawing Sheets

(56) References Cited

U.S. PATENT DOCUMENTS

| | | |
|---|---|---|
| 2015/0022735 A1 | 1/2015 | Hsu |
| 2015/0085205 A1 | 3/2015 | Chen et al. |
| 2015/0220177 A1 | 8/2015 | Park et al. |
| 2016/0162096 A1 | 6/2016 | Hao et al. |
| 2016/0342234 A1 | 11/2016 | Xu |

OTHER PUBLICATIONS

First Office Action in the Chinese Patent Application No. 201510524282.X, dated Jul. 19, 2017; English translation attached.
Notice of Allowance in the U.S. Appl. No. 15/501,852, dated Jan. 17, 2019.
Non-Final Office Action in the U.S. Appl. No. 15/501,852, dated May 25, 2018.
Response to Non-Final Office Action in the U.S. Appl. No. 15/501,852, dated Aug. 10, 2018.
Interview Summary in the U.S. Appl. No. 15/501,852, dated Dec. 4, 2018.
Final Office Action in the U.S. Appl. No. 15/501,852, dated Sep. 28, 2018.
Response to Final Office Action in the U.S. Appl. No. 15/501,852, dated Dec. 25, 2018.

\* cited by examiner

MUTUAL CAPACITIVE TOUCH SUBSTRATE, MUTUAL CAPACITIVE TOUCH PANEL, AND MUTUAL CAPACITIVE TOUCH APPARATUS

CROSS-REFERENCE TO RELATED APPLICATION

This application is a continuation of U.S. application Ser. No. 15/501,852, filed May 20, 2016, which is a national stage application under 35 U.S.C. § 371 of International Application No. PCT/CN2016/082862, filed May 20, 2016, which claims priority to Chinese Patent Application No. 201510524282.X, filed Aug. 24, 2015. Each of the forgoing applications is herein incorporated by reference in its entirety for all purposes.

TECHNICAL FIELD

The present invention relates to display technology, more particularly, to a mutual capacitive touch substrate, a mutual capacitive touch panel, and a mutual capacitive touch display apparatus.

BACKGROUND

Touch control display panels have found a wide range of applications in display field. A conventional touch control display panel includes a plurality of first touch electrodes arranged in columns forming a plurality of first conductive channels, and a plurality of second touch electrode in rows forming a plurality of second conductive channels. Two adjacent first touch electrodes along a column are connected through a first bridge. Two adjacent second touch electrodes along a row are connected through a second bridge. When a finger touches a point on the touch control display panel, the capacitor of the finger superimposes on the touch panel capacitor, resulting in a change in the capacitance of the touch panel capacitor. In a mutual capacitive touch display panel, the first electrode may be a sensing electrode and the second electrode may be a driving electrode. In detecting touch events, the mutual capacitive touch display panel examines the first electrode array and the second electrode array sequentially. Based on the capacitance change upon a touch event, the coordinates of the first electrode and the second electrode being touched may be determined. Touch resolution correlates with the distance between adjacent conductive channels. A smaller distance between adjacent conductive channels results in a higher touch resolution.

SUMMARY

In one aspect, the present invention provides a mutual capacitive touch substrate comprising a matrix of a plurality of electrode units, adjacent electrode units complementarily matching each other, each electrode unit comprising a first electrode having a first undulating boundary; a second electrode having a second undulating boundary; and a fill pattern between the first electrode and the second electrode, having an undulating boundary substantially complementary to corresponding portions of the first undulating boundary and the second undulating boundary; the first electrode, the second electrode, and the fill pattern in a same electrode unit are electrically isolated from each other.

Optionally, the fill pattern is a mosaic pattern comprising at least two adjacent sub-patterns.

Optionally, the first electrode comprises a first part, a second part, and a first bridge electrically connecting the first part and the second part; the first part, the second part, and the first bridge arranged substantially along a first direction; the second electrode comprises a third part, a fourth part, and a second bridge electrically connecting the third part and the fourth part and dividing the first electrode into the first part and the second part; the third part, the fourth part, and the second bridge arranged substantially along a second direction, the second direction intersecting the first direction; and the first part, the second part, the third part, the fourth part, and the second bridge are in a first layer, the first bridge is in a second layer different from the first layer.

Optionally, the first electrode comprises at least one protrusion extending substantially along the second direction.

Optionally, the at least one protrusion has an undulating boundary that is a part of the first undulating boundary, a portion of the second electrode proximal to the at least one protrusion has an undulating boundary that is a part of the second undulating boundary, a portion of the fill pattern is between the at least one protrusion and the portion of the second electrode proximal to the at least one protrusion, the portion of the fill pattern has an undulating boundary substantially complementary to the at least one protrusion and the portion of the second electrode proximal to the at least one protrusion.

Optionally, the at least one protrusion comprises a plurality of protrusions that are symmetrical relative to an axis of the first electrode along the first direction.

Optionally, the fill pattern comprises at least two adjacent sub-patterns between the second electrode and the first part of the first electrode, and at least two adjacent sub-patterns between the second electrode and the second part of the first electrode.

Optionally, the undulating boundary of the fill pattern is a smoothly curved boundary.

Optionally, the undulating boundary of the fill pattern is a polygonal curve.

Optionally, the first electrode, the second electrode, and the fill pattern are electrically isolated from each other.

Optionally, the matrix of electrode units comprises a plurality of rows of electrode units along the first direction and a plurality of columns of electrode units along the second direction; a plurality of second electrodes in each row of electrode units are electrically isolated from each other, a plurality of first electrodes in each column of electrode units are electrically isolated from each other; the plurality of first electrodes in each row of electrode units form a first conduction channel along the first direction comprising a plurality of first integral electrode blocks connected by a plurality of first bridges; the first part and the second part from two adjacent electrode units respectively constitute each first integral electrode block; and the plurality of second electrodes in each column of electrode units form a second conduction channel along the second direction comprising a plurality of second integral electrode blocks connected by a plurality of second bridges; the third part and the fourth part from two adjacent electrode units respectively constitute each second integral electrode block.

Optionally, midlines of first conduction channels are spaced apart by a distance in the range of about 3 mm to about 6 mm, and midlines of second conduction channels are spaced apart by a distance in the range of about 3 mm to about 6 mm.

Optionally, the first electrode comprises a plurality of protrusions extending substantially along the second direction, the plurality of protrusions are symmetrical relative to an axis of the first electrode along the first direction; and midlines of first conduction channels are spaced apart by a distance in the range of about 6 mm to about 10 mm, and midlines of second conduction channels are spaced apart by a distance in the range of about 6 mm to about 10 mm.

Optionally, the mutual capacitive touch substrate comprises a plurality of first conduction channel groups and a plurality of second conduction channel groups; each first conduction channel group comprises two adjacent first conduction channels electrically connected in parallel, each second conduction channel group comprises two adjacent second conduction channels electrically connected in parallel; midlines of first conduction channel groups are spaced apart by a distance in the range of about 10 mm to about 15 mm, and midlines of second conduction channel groups are spaced apart by a distance in the range of about 10 mm to about 15 mm.

In another aspect, the present invention provides a mutual capacitive touch panel comprising a mutual capacitive touch substrate described herein.

In another aspect, the present invention provides a mutual capacitive touch display apparatus comprising the mutual capacitive touch panel described herein, an array substrate, and a package substrate.

Optionally, the mutual capacitive touch panel is an in-cell touch panel.

Optionally, the mutual capacitive touch panel is an on-cell touch panel.

Optionally, the mutual capacitive touch panel is an add-on type touch panel.

Optionally, the mutual capacitive touch panel is a one-glass-solution type touch panel.

Optionally, the mutual capacitive touch panel is a glass-film-film type touch panel.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now describe more specifically with reference to the following embodiments. It is to be noted that the following descriptions of some embodiments are presented herein for purpose of illustration and description only. It is not intended to be exhaustive or to be limited to the precise form disclosed.

In conventional mutual capacitive touch substrates, the first touch electrode and the second touch electrode are of regular shapes. During image display, touch electrodes having regular shapes cause optical interference of light, resulting in a lower contrast level in image display. The present disclosure provides a superior mutual capacitive touch substrate that has an excellent blanking effect, a higher touch resolution, and is compatible with multiple types of touch control chips.

In some embodiments, the mutual capacitive touch substrate includes a matrix of a plurality of electrode units, adjacent electrode units complementarily matching each other. For example, the matrix may include a plurality of rows along the first direction and a plurality of columns of electrode units along the second direction. Each electrode unit includes a first electrode having a first undulating boundary, a second electrode having a second undulating boundary; and a fill pattern between the first electrode and the second electrode, having an undulating boundary substantially complementary to corresponding portions of the first undulating boundary and the second undulating boundary. The first electrode, the second electrode, and the fill pattern in a same electrode unit are electrically isolated from each other. Optionally, the fill pattern is a mosaic pattern comprising at least two adjacent sub-patterns (e.g., 3, 4, 5, 6 or more).

Figure 1:
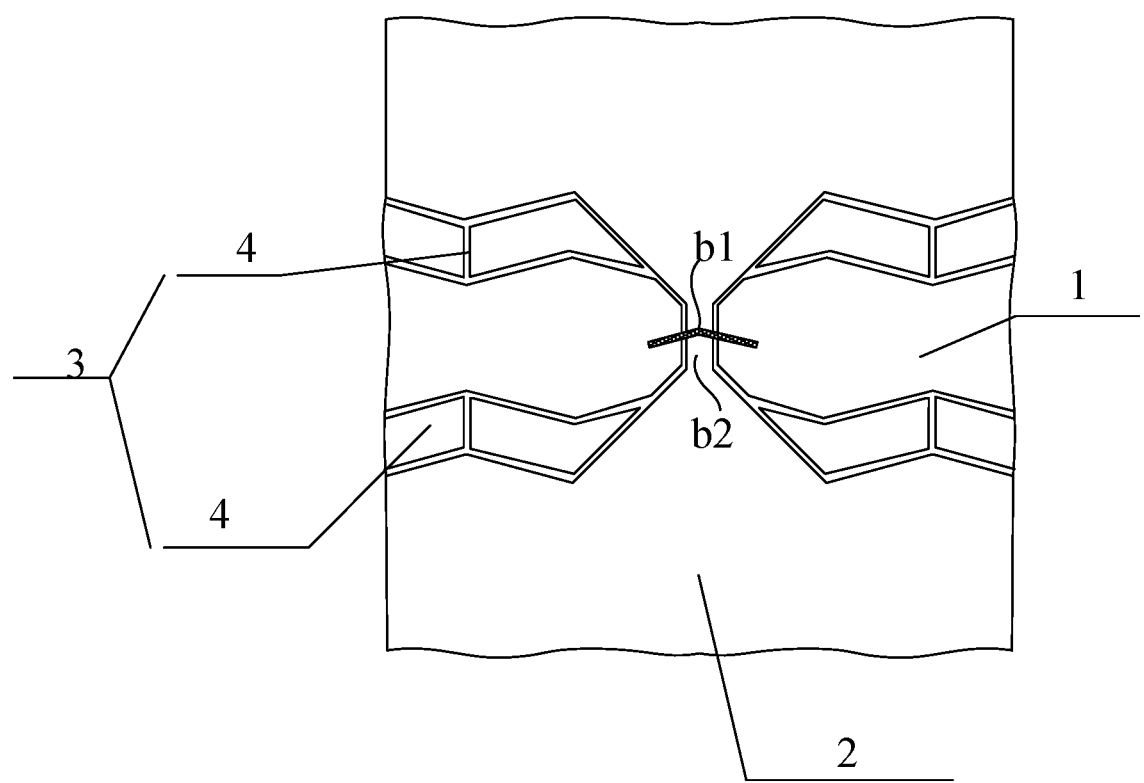
FIG. 1 is a diagram illustrating the structure of an electrode unit of a mutual capacitive touch substrate in some embodiments.

FIG. 1 is a diagram illustrating the structure of an electrode unit of a mutual capacitive touch substrate in some embodiments. Referring to FIG. 1, the electrode unit in the embodiment includes a first electrode 1 and a second electrode 2. The first electrode 1 includes a first part, a second part, and a first bridge b1 electrically connecting the first part and the second part. The first part, the second part, and the first bridge b1 are arranged substantially along a first direction (e.g., the row direction). The second electrode 2 includes a third part, a fourth part, and a second bridge b2 electrically connecting the third part and the fourth part and dividing the first electrode 1 into the first part and the second part. The third part, the fourth part, and the second bridge b2 arranged substantially along a second direction (e.g., the column direction), the second direction intersecting the first direction. Optionally, the first part, the second part, the third part, the fourth part, and the second bridge b2 are in a first layer, and the first bridge b1 is in a second layer different from the first layer. The first part and the second part of the first electrode 1 are separated from each other by the second bridge b2. The first part and the second part are electrically isolated from the second bridge b2. The first part and the second part are electrically connected together through the first bridge b1.

Referring to FIG. 1, the electrode unit further includes a fill pattern 3 between the first electrode 1 and the second electrode 2, having an undulating boundary substantially complementary to corresponding portions of the first undulating boundary of the first electrode 1 and the second undulating boundary of the second electrode 2. As shown in FIG. 1, the fill pattern 3 are electrically isolated from the first electrode 1 and the second electrode 2. The fill pattern 3 in FIG. 1 is a mosaic pattern having at least two adjacent sub-patterns 4. Optionally, the fill pattern 3 or any sub-pattern 4 thereof may have an irregular shape. Optionally, the fill pattern 3 is a mosaic pattern having at least two adjacent sub-patterns 4 having irregular shapes substantially complementary to each other and substantially complementary to corresponding portions of the first electrode 1 and the second electrode 2.

The present mutual capacitive touch substrate includes a fill pattern between the first electrode and the second electrode. By having a first electrode and a second electrode with undulating boundaries, and a fill pattern with a complementary undulating boundary in the mutual capacitive touch substrate, optical interference between boundaries of the electrodes are significantly suppressed, achieving an excellent blanking effect.

Figure 3:
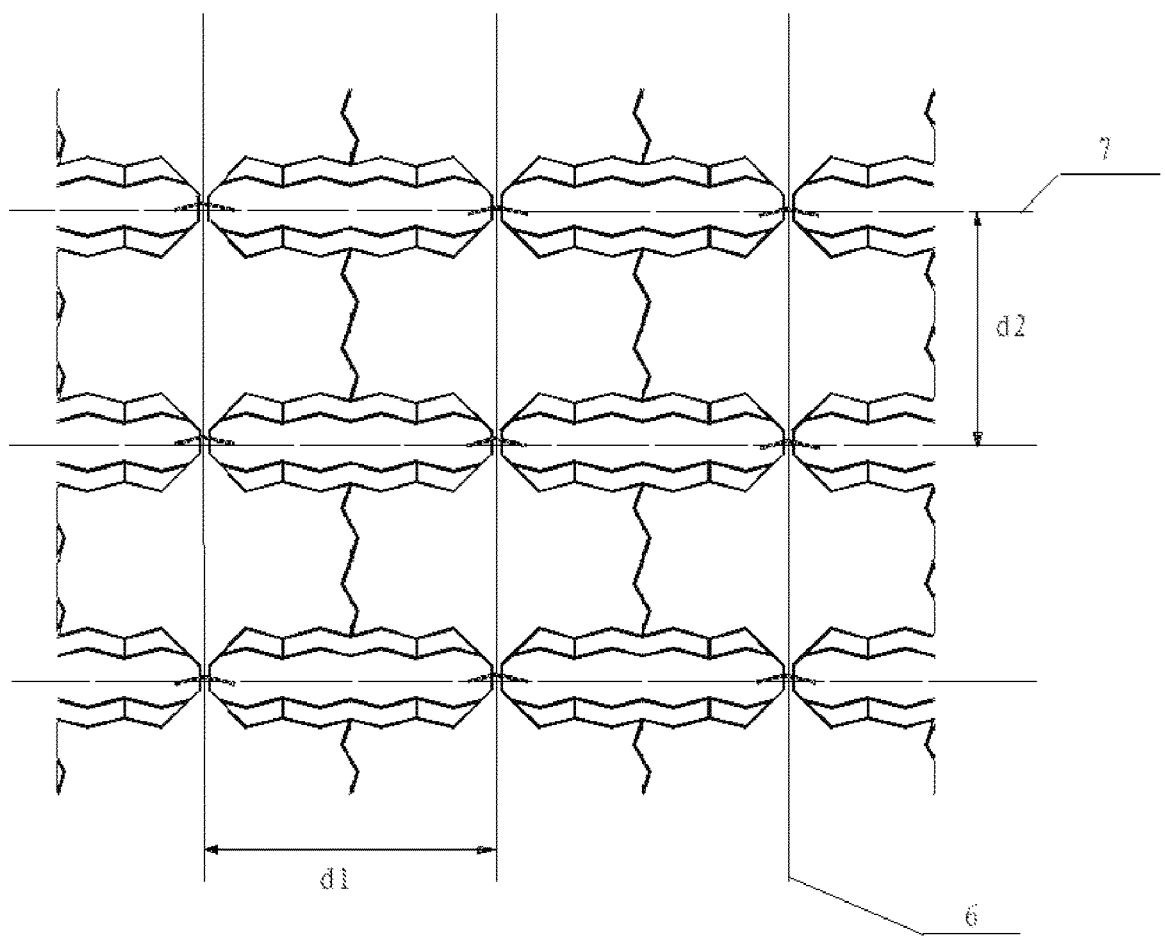
FIG. 3 illustrated the structure a mutual capacitive touch substrate in some embodiments.

FIG. 3 illustrated the structure a mutual capacitive touch substrate in some embodiments. The mutual capacitive touch substrate in the embodiment is a matrix of a plurality of electrode units (e.g., the electrode unit as shown in FIG. 1), adjacent electrode units complementarily matching each other. Referring to FIG. 3, the matrix of electrode units includes a plurality of rows along the first direction and a plurality of columns of electrode units along the second direction, the first direction intersecting the second direction. As shown in FIG. 3, the plurality of second electrodes in each row of electrode units are electrically isolated from each other, the plurality of first electrodes in each column of electrode units are electrically isolated from each other. The plurality of first electrodes in each row of electrode units form a first conduction channel 7 along the first direction including a plurality of first integral electrode blocks connected in series by a plurality of first bridges. The first part and the second part from two adjacent electrode units respectively constitute each first integral electrode block. The plurality of second electrodes in each column of electrode units form a second conduction channel 6 along the second direction including a plurality of second integral electrode blocks connected in series by a plurality of second bridges. The third part and the fourth part from two adjacent electrode units respectively constitute each second integral electrode block. As shown in FIG. 3, each first integral electrode block is substantially surrounded by a fill pattern having an undulating boundary and a mosaic pattern constituted by a plurality of irregularly shaped sub-patterns.

In some embodiments, the mutual capacitive touch substrate includes a matrix of a plurality of units, adjacent units complementarily matching each other. Optionally, each unit includes a first integral electrode block having a first undulating boundary, a second integral electrode block having a second undulating boundary, and a fill pattern between the first integral electrode block and the second integral electrode block. The fill pattern has an undulating boundary substantially complementary to corresponding portions of the first undulating boundary and the second undulating boundary. The first integral electrode block, the second integral electrode block, and the fill pattern are electrically isolated from each other in a same unit. Optionally, the fill pattern is a mosaic pattern constituted by at least two adjacent sub-patterns.

In some embodiments, the mutual capacitive touch substrate includes a plurality of rows of first integral electrode blocks connected in series by a plurality of first bridges along the first direction thereby forming a first conductive channel; and a plurality of columns of second integral electrode blocks connected in series by a plurality of second bridges along the second direction thereby forming a second conductive channel. The mutual capacitive touch substrate further includes a fill pattern layer on a same layer as the first integral electrode blocks and the second integral electrode blocks. The fill pattern layer includes a plurality of fill patterns, which is a mosaic pattern having at least two adjacent sub-patterns. Each first integral electrode block is substantially surrounded by a fill pattern having an undulating boundary and a mosaic pattern constituted by a plurality of irregularly shaped sub-patterns. A plurality of second integral electrode blocks are electrically isolated from each other along the first direction, a plurality of first integral electrode blocks are electrically isolated from each other along second direction. Optionally, the first integral electrode block, the second integral electrode block, and the second bridge are in a first layer, the first bridge is in a second layer different from the first layer.

Optionally, the first direction is a horizontal direction and the second direction is a longitudinal direction. Optionally, the first direction is a longitudinal direction and the second direction is a horizontal direction. Optionally, the first direction and the second direction are substantially orthogonal to each other. Depending on specific electrode pattern design, the first direction and the second direction may intersect each other at an angle other than a right angle.

Optionally, a plurality of the second conductive channels are electrically isolated from each other by an undulating pattern, e.g., a polygonal curve.

In some embodiments, the first electrode includes at least one protrusion extending substantially along the second direction. Optionally, the first part includes at least one protrusion extending substantially along the second direction. Optionally, the second part includes at least one protrusion extending substantially along the second direction. Optionally, the first part includes at least one protrusion extending substantially along the second direction, and the second part includes at least one protrusion extending substantially along the second direction.

In some embodiments, the first electrode includes at least two protrusions on two opposite sides of the first electrode, each of which extending substantially along the second direction. Optionally, the first part includes at least two protrusions on two opposite sides of the first part, each of which extending substantially along the second direction. Optionally, the second part includes at least two protrusions on two opposite sides of the second part, each of which extending substantially along the second direction. Optionally, the first part includes at least two protrusions on two opposite sides of the first part, each of which extending substantially along the second direction; and the second part includes at least two protrusions on two opposite sides of the second part, each of which extending substantially along the second direction.

In some embodiments, the first electrode includes at least two protrusions on a same side of the first electrode, each of which extending substantially along the second direction. For example, the first part may include at least one protrusion and the second part may include a protrusion, both protrusions on a same side of the first electrode and extending substantially along the second direction.

Figure 2:
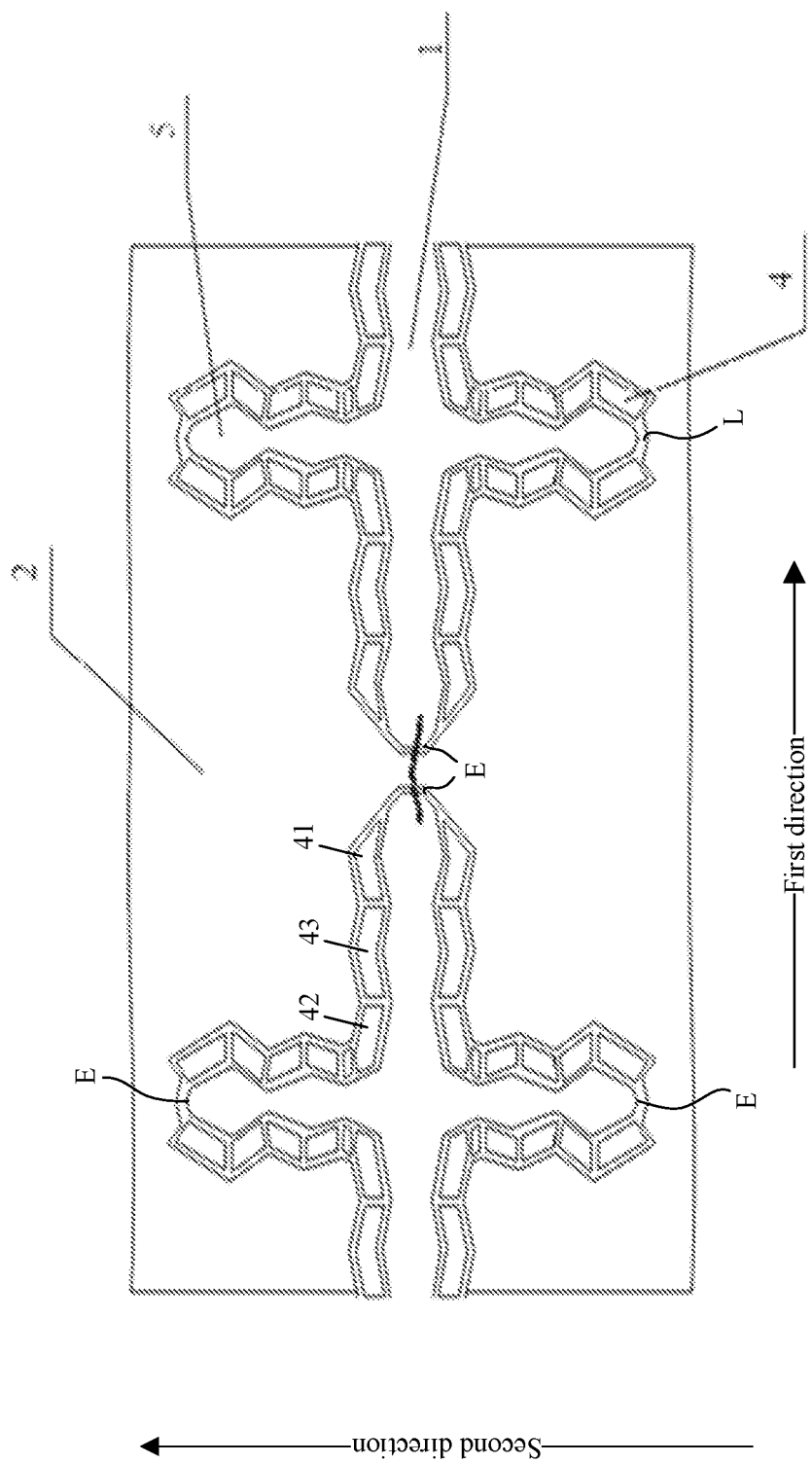
FIG. 2 is a diagram illustrating the structure of an electrode unit of a mutual capacitive touch substrate in some embodiments.

FIG. 2 is a diagram illustrating the structure of an electrode unit of a mutual capacitive touch substrate in some embodiments. Referring to FIG. 2, the first electrode 1 includes at least two protrusions 5 on a same side of the first electrode 1, each of which extending substantially along the second direction. As shown in FIG. 2, on a first side of the first electrode, the first part includes a protrusion 5 and the second part includes a protrusion 5, both protrusions extending substantially along the second direction. On a second side of the first electrode, the first part also includes a protrusion 5 and the second part includes a protrusion 5, both protrusions extending substantially along the second direction. As shown in FIG. 2, the first electrode 1 includes a plurality of end parts E. Each one of the plurality of end parts E of the first electrode 1 is divided from the second electrode 2 by one a single etching line L. Optionally, as shown in FIG. 2, the single etching line L has a shape of a wavy line. Optionally, each one of the plurality of end parts E is a farthest end from a geometry center of the first electrode 1 along a first direction or along a second direction, the second direction intersecting the first direction.

In some embodiments, a plurality of protrusions that are symmetrical relative to an axis of the first electrode along the first direction.

Inclusion of at least one protrusion 5 in the first electrode 1 increases effective touch-control areas and reduces sensing blind spots in the mutual capacitive touch substrate. By having this design, the number of inductive positions in the substrate is increased, resulting in a higher touch resolution.

As the number of protrusions 5 increases, the number of etching lines on the substrate also increases. Optionally, each first electrode 1 include four protrusions, i.e., the first part includes two protrusions 5 on two opposite sides of the first electrode 1, and the second part includes two protrusions 5 on two opposite sides of the first electrode 1. Optionally, all protrusions 5 extend along the second direction.

In some embodiments, the at least one protrusion 5 has an undulating boundary that is a part of the first undulating boundary, a portion of the second electrode proximal to the at least one protrusion has an undulating boundary that is a part of the second undulating boundary. Optionally, a portion of the fill pattern is between the at least one protrusion and the portion of the second electrode proximal to the at least one protrusion. Optionally, the portion of the fill pattern has an undulating boundary substantially complementary to the at least one protrusion and the portion of the second electrode proximal to the at least one protrusion. This design further enhances the blanking effect between electrodes.

The fill pattern 3 and any sub-pattern thereof can be made of any appropriate shape having an undulating boundary. Optionally, the fill pattern 3 and any sub-pattern thereof are made of an irregular shape having an undulating boundary. The undulating boundary of the fill pattern or any sub-pattern thereof may have any appropriate undulating boundary, examples of which include a smoothly curved undulating boundary and a polygonal curved undulating boundary including multiple sectional lines, or a combination thereof.

Sub-pattern 4 may be made of any appropriate shape, examples of which include a parallelogram and a polygon. Optionally, the sub-pattern 4 has an irregular shape, e.g., an irregular polygon shape. Optionally, each sub-pattern 4 has a boundary substantially complementary to corresponding portions of adjacent sub-patterns 4 and corresponding portions of the first undulating boundary and the second undulating boundary. Sub-patterns 4 along a first direction comprise a first end sub-pattern 41, a second end sub-pattern 42, and a middle sub-pattern 43 between the first end sub-pattern 41 and the second end sub-pattern 42. Optionally, as shown in FIG. 2, the middle sub-pattern has a shape of a concave hexagon.

In a mutual capacitive touch substrate having a matrix of a plurality of electrode units described herein, the mutual capacitive touch substrate includes a plurality of first conduction channel 7 substantially along the first direction and a plurality of second conduction channels 6 substantially along the second direction for conducting touch signals, e.g., the capacitance change around a touch point. Based on the capacitance change upon a touch event, the coordinates of the first electrode and the second electrode being touched may be determined.

FIG. 3 illustrated the structure a mutual capacitive touch substrate in some embodiments. Referring to FIG. 3, the mutual capacitive touch substrate in the embodiment includes a matrix of a plurality of electrode units (e.g., a plurality of electrode units as shown in FIG. 1). The matrix includes a plurality of rows of electrode units along the first direction and a plurality of columns of electrode units along the second direction. The plurality of second electrodes in each row of electrode units are electrically isolated from each other, and the plurality of first electrodes in each column of electrode units are electrically isolated from each other. As shown in FIG. 3, the plurality of first electrodes in each row of electrode units form a first conduction channel 7 along the first direction including a plurality of first integral electrode blocks connected in series by a plurality of first bridges; the first part and the second part from two adjacent electrode units respectively constitute each first integral electrode block. The plurality of second electrodes in each column of electrode units form a second conduction channel 6 along the second direction including a plurality of second integral electrode blocks connected in series by a plurality of second bridges; the third part and the fourth part from two adjacent electrode units respectively constitute each second integral electrode block. Optionally, the first integral electrode block, the second integral electrode block, and the second bridge are in a first layer, the first bridge is in a second layer different from the first layer.

Referring to FIG. 3, the plurality of first bridges in each row of electrode unit form a midline of the first conduction channel 7, and the plurality of second bridges in each column of electrode unit form a midline of the second conduction channel 6. Optionally, midlines of first conduction channels are spaced apart by a distance d2 in the range of about 3 mm to about 6 mm, and midlines of second conduction channels are spaced apart by a distance d1 in the range of about 3 mm to about 6 mm. A mutual capacitive touch substrate having these channel spacing is suitable for use in combination with a touch-control chip having a relative small channel spacing.

Figure 4:
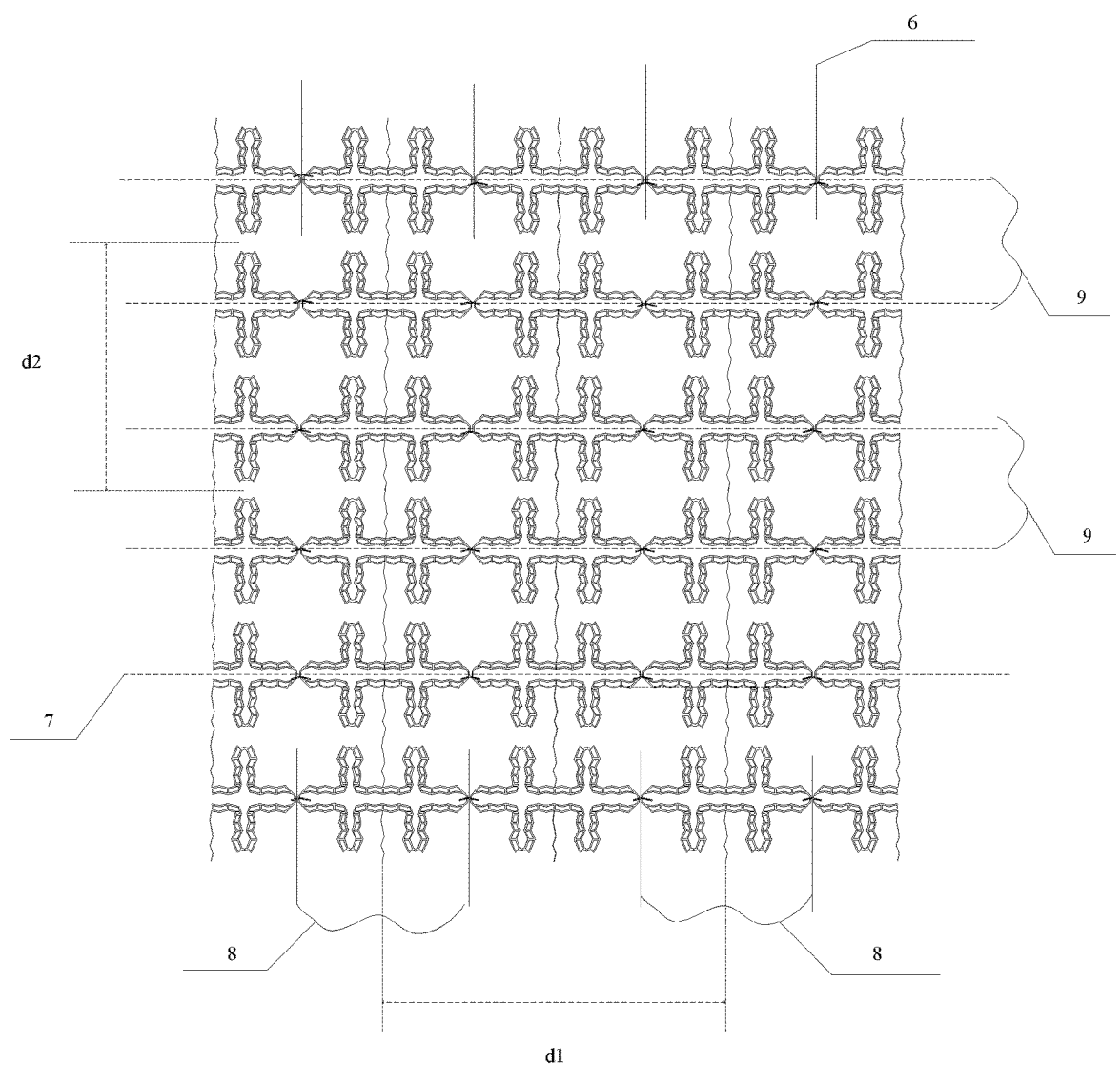
FIG. 4 illustrated the structure a mutual capacitive touch substrate in some embodiments.

FIG. 4 illustrated the structure a mutual capacitive touch substrate in some embodiments. Referring to FIG. 4, the mutual capacitive touch substrate in the embodiment includes a matrix of a plurality of electrode units (e.g., a plurality of electrode units as shown in FIG. 2). The matrix includes a plurality of rows of electrode units along the first direction and a plurality of columns of electrode units along the second direction. The plurality of second electrodes in each row of electrode units are electrically isolated from each other, and the plurality of first electrodes in each column of electrode units are electrically isolated from each other. As shown in FIG. 4, the plurality of first electrodes in each row of electrode units form a first conduction channel 7 along the first direction including a plurality of first integral electrode blocks connected in series by a plurality of first bridges; the first part and the second part from two adjacent electrode units respectively constitute each first integral electrode block. The plurality of second electrodes in each column of electrode units form a second conduction channel 6 along the second direction including a plurality of second integral electrode blocks connected in series by a plurality of second bridges; the third part and the fourth part from two adjacent electrode units respectively constitute each second integral electrode block. Optionally, the first integral electrode block, the second integral electrode block, and the second bridge are in a first layer, the first bridge is in a second layer different from the first layer.

Referring to FIG. 4, the plurality of first bridges in each row of electrode unit form a midline of the first conduction channel 7, and the plurality of second bridges in each column of electrode unit form a midline of the second conduction channel 6. Optionally, midlines of first conduction channels are spaced apart by a distance in the range of about 6 mm to about 10 mm, and midlines of second conduction channels are spaced apart by a distance in the range of about 6 mm to about 10 mm. A mutual capacitive touch substrate having these channel spacing is suitable for use in combination with a touch-control chip having a relative large channel spacing.

In some embodiments, two or more adjacent first conduction channels 7 may be electrically connected in parallel to form a first conduction channel group 9. In some embodiments, two or more adjacent second conduction channels 6 may be electrically connected in parallel to form a second conduction channel group 8. Optionally, two or more adjacent first conduction channels 7 may be electrically connected in parallel to form a first conduction channel group 9, and two or more adjacent second conduction channels 6 may be electrically connected in parallel to form a second conduction channel group 8. Referring to FIG. 4, two adjacent first conduction channels 7 are electrically connected in parallel to form a first conduction channel group 9, and two adjacent second conduction channels 6 are electrically connected in parallel to form a second conduction channel group 8. Optionally, midlines of first conduction channel groups are spaced apart by a distance in the range of about 10 mm to about 15 mm. Optionally, midlines of second conduction channel groups are spaced apart by a distance in the range of about 10 mm to about 15 mm.

Each conduction channel group may be connected to a signal source in a touch-control chip. For example, two adjacent first conduction channels 7 may be electrically connected in parallel to form a first conduction channel group 9, each first conduction channel group 9 is then electrically connected with a signal source in a touch control chip. Similarly, two adjacent second conduction channels 6 may be electrically connected in parallel to form a second conduction channel group 8, each second conduction channel group 8 is then electrically connected with a signal source in a touch control chip. Referring to FIG. 4, midlines of first conduction channel groups 9 are spaced apart by a distance d2, and midlines of second conduction channel groups 8 are spaced apart by a distance d1. The spacing between midlines of first conduction channel groups 9, d2, is twice of the spacing between midlines of first conduction channel 7. The spacing between midlines of second conduction channel groups 8, d1, is twice the spacing between midlines of second conduction channel 6. Thus, a mutual capacitive touch substrate having these channel group spacing is suitable for use in combination with a touch-control chip having a very large channel spacing.

By electrically connecting two or more conduction channels in parallel to form conduction channel groups (e.g., the first conduction channel groups 9 and the second conduction channel groups 8), a larger channel spacing may be achieved in the mutual capacitive touch substrate. A mutual capacitive touch substrate having this design is compatible with a less expensive touch control chip having fewer signal sources and a larger channel spacing.

In another aspect, the present disclosure provides a mutual capacitive touch panel having a mutual capacitive touch substrate described herein.

In another aspect, the present disclosure provides a mutual capacitive touch display apparatus having an array substrate, a package substrate, and a mutual capacitive touch panel described herein. Optionally, the mutual capacitive touch panel is an in-cell touch panel. Optionally, the mutual capacitive touch panel is an on-cell touch panel. Optionally, the mutual capacitive touch panel is an add-on type touch panel. Add-on type touch panel will have either touch electrodes embedded on a glass surface or on a thin film. Optionally, the add-on type touch panel is a one-glass-solution type touch panel. In the one-glass-solution type touch panel, touch electrodes are integrated on a cover glass. Optionally, the mutual capacitive touch panel is a glass-film-film type touch panel.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A mutual capacitive touch substrate, comprising a matrix of a plurality of electrode units, adjacent electrode units complementarily matching each other, a respective one of the plurality of electrode units comprising:
   a first electrode having a first undulating boundary;
   a second electrode having a second undulating boundary; and
   a fill pattern between the first electrode and the second electrode, having an undulating boundary substantially complementary to corresponding portions of the first undulating boundary and the second undulating boundary;
   wherein the first electrode, the second electrode, and the fill pattern in a same electrode unit are electrically isolated from each other;
   the fill pattern comprises a plurality of sub-patterns;
   at least one of the plurality of sub-patterns has an irregular shape;
   the first electrode comprises a first part, a second part, and a first bridge electrically connecting the first part and the second part; the first part, the second part, and the first bridge arranged substantially along a first direction;
   sub-patterns along the first direction comprise a first end sub-pattern, a second end sub-pattern, and a middle sub-pattern between the first end sub-pattern and the second end sub-pattern; and the middle sub-pattern has a shape of a concave hexagon.

2. The mutual capacitive touch substrate of claim 1, wherein each of the first end sub-pattern and the second end sub-pattern has a shape of pentagon;
one of the first end sub-pattern and the second end sub-pattern has a shape of a concave pentagon; and
another of the first end sub-pattern and the second end sub-pattern has a shape of a convex pentagon.

3. The mutual capacitive touch substrate of claim 1, wherein the first electrode comprises at least one protrusion extending substantially along a second direction, the second direction intersecting the first direction; and
at least 80% of sub-patterns along the second direction has a shape of quadrilateral.

4. The mutual capacitive touch substrate of claim 3, wherein the at least one protrusion has an undulating boundary that is a part of the first undulating boundary, a portion of the second electrode proximal to the at least one protrusion has an undulating boundary that is a part of the second undulating boundary, a portion of the fill pattern is between the at least one protrusion and the portion of the second electrode proximal to the at least one protrusion, the portion of the fill pattern has an undulating boundary substantially complementary to the at least one protrusion and the portion of the second electrode proximal to the at least one protrusion.

5. The mutual capacitive touch substrate of claim 3, wherein the at least one protrusion comprises a plurality of protrusions that are symmetrical relative to an axis of the first electrode along the first direction.

6. The mutual capacitive touch substrate of claim 1, wherein
the second electrode comprises a third part, a fourth part, and a second bridge electrically connecting the third part and the fourth part and dividing the first electrode into the first part and the second part; the third part, the fourth part, and the second bridge arranged substantially along a second direction, the second direction intersecting the first direction; and
the first part, the second part, the third part, the fourth part, and the second bridge are in a first layer, the first bridge is in a second layer different from the first layer.

7. The mutual capacitive touch substrate of claim 6, wherein the matrix of the plurality of electrode units comprises a plurality of rows of electrode units along the first direction and a plurality of columns of electrode units along the second direction;
a plurality of second electrodes in each row of electrode units are electrically isolated from each other, a plurality of first electrodes in each column of electrode units are electrically isolated from each other;
the plurality of first electrodes in each row of electrode units form a first conduction channel along the first direction comprising a plurality of first integral electrode blocks connected by a plurality of first bridges; the first part and the second part from two adjacent electrode units respectively constitute each first integral electrode block; and
the plurality of second electrodes in each column of electrode units form a second conduction channel along the second direction comprising a plurality of second integral electrode blocks connected by a plurality of second bridges; the third part and the fourth part from two adjacent electrode units respectively constitute each second integral electrode block.

8. The mutual capacitive touch substrate of claim 7, wherein midlines of first conduction channels are spaced apart by a distance in a range of about 3 mm to about 6 mm, and midlines of second conduction channels are spaced apart by a distance in a range of about 3 mm to about 6 mm.

9. The mutual capacitive touch substrate of claim 7, wherein the first electrode comprises a plurality of protrusions extending substantially along the second direction, the plurality of protrusions are symmetrical relative to an axis of the first electrode along the first direction; and
midlines of first conduction channels are spaced apart by a distance in a range of about 6 mm to about 10 mm, and midlines of second conduction channels are spaced apart by a distance in a range of about 6 mm to about 10 mm.

10. The mutual capacitive touch substrate of claim 7, comprising a plurality of first conduction channel groups and a plurality of second conduction channel groups; each first conduction channel group comprises two adjacent first conduction channels electrically connected in parallel, each second conduction channel group comprises two adjacent second conduction channels electrically connected in parallel; and
midlines of first conduction channel groups are spaced apart by a distance in a range of about 10 mm to about 15 mm, and midlines of second conduction channel groups are spaced apart by a distance in a range of about 10 mm to about 15 mm.

11. A mutual capacitive touch display apparatus, comprising the mutual capacitive touch substrate of claim 1.

12. A mutual capacitive touch substrate, comprising a matrix of a plurality of electrode units, adjacent electrode units complementarily matching each other, a respective one of the plurality of electrode units comprising:
a first electrode having a first undulating boundary;
a second electrode having a second undulating boundary; and
a fill pattern between the first electrode and the second electrode, having an undulating boundary substantially complementary to corresponding portions of the first undulating boundary and the second undulating boundary;
wherein the first electrode, the second electrode, and the fill pattern in a same electrode unit are electrically isolated from each other;
the fill pattern comprises a plurality of sub-patterns;
at least one of the plurality of sub-patterns has an irregular shape;
the first undulating boundary is substantially parallel to the second undulating boundary;
the first electrode comprises a plurality of end parts;
each one of the plurality of end parts of the first electrode is divided from the second electrode by only a single etching line where the plurality of sub-patterns are completely absent between each one of the plurality of end parts of the first electrode and the second electrode;
the single etching line has a shape of a wavy line; and
the each one of the plurality of end parts is a farthest end from a geometry center of the first electrode along a first direction or along a second direction, the second direction intersecting the first direction.

13. The mutual capacitive touch substrate of claim 12, wherein the first electrode comprises a first part, a second part, and a first bridge electrically connecting the first part and the second part; the first part, the second part, and the first bridge arranged substantially along the first direction;

the second electrode comprises a third part, a fourth part, and a second bridge electrically connecting the third part and the fourth part and dividing the first electrode into the first part and the second part; the third part, the fourth part, and the second bridge arranged substantially along the second direction; and the first part, the second part, the third part, the fourth part, and the second bridge are in a first layer, the first bridge is in a second layer different from the first layer.

14. The mutual capacitive touch substrate of claim 13, wherein the matrix of the plurality of electrode units comprises a plurality of rows of electrode units along the first direction and a plurality of columns of electrode units along the second direction;

a plurality of second electrodes in each row of electrode units are electrically isolated from each other, a plurality of first electrodes in each column of electrode units are electrically isolated from each other;

the plurality of first electrodes in each row of electrode units form a first conduction channel along the first direction comprising a plurality of first integral electrode blocks connected by a plurality of first bridges; the first part and the second part from two adjacent electrode units respectively constitute each first integral electrode block; and the plurality of second electrodes in each column of electrode units form a second conduction channel along the second direction comprising a plurality of second integral electrode blocks connected by a plurality of second bridges; the third part and the fourth part from two adjacent electrode units respectively constitute each second integral electrode block.

15. The mutual capacitive touch substrate of claim 14, wherein midlines of first conduction channels are spaced apart by a distance in a range of about 3 mm to about 6 mm, and midlines of second conduction channels are spaced apart by a distance a range of about 3 mm to about 6 mm.

16. The mutual capacitive touch substrate of claim 14, wherein the first electrode comprises a plurality of protrusions extending substantially along the second direction, the plurality of protrusions are symmetrical relative to an axis of the first electrode along the first direction; and midlines of first conduction channels are spaced apart by a distance in a range of about 6 mm to about 10 mm, and midlines of second conduction channels are spaced apart by a distance in a range of about 6 mm to about 10 mm.

17. The mutual capacitive touch substrate of claim 14, comprising a plurality of first conduction channel groups and a plurality of second conduction channel groups; each first conduction channel group comprises two adjacent first conduction channels electrically connected in parallel, each second conduction channel group comprises two adjacent second conduction channels electrically connected in parallel; and midlines of first conduction channel groups are spaced apart by a distance in a range of about 10 mm to about 15 mm, and midlines of second conduction channel groups are spaced apart by a distance in a range of about 10 mm to about 15 mm.

18. The mutual capacitive touch substrate of claim 12, wherein the first electrode comprises at least one protrusion extending substantially along a second direction; and the at least one protrusion has an undulating boundary that is a part of the first undulating boundary, a portion of the second electrode proximal to the at least one protrusion has an undulating boundary that is a part of the second undulating boundary, a portion of the fill pattern is between the at least one protrusion and the portion of the second electrode proximal to the at least one protrusion, the portion of the fill pattern has an undulating boundary substantially complementary to the at least one protrusion and the portion of the second electrode proximal to the at least one protrusion.

19. The mutual capacitive touch substrate of claim 12, wherein the first electrode comprises at least one protrusion extending substantially along the second direction; and the at least one protrusion comprises a plurality of protrusions that are symmetrical relative to an axis of the first electrode along the first direction.

20. A mutual capacitive touch display apparatus, comprising the mutual capacitive touch substrate of claim 12.

* * * * *